United States Patent
Bollineni

(10) Patent No.: US 9,857,889 B2
(45) Date of Patent: Jan. 2, 2018

(54) METHOD AND DEVICE FOR HANDLING EVENT INVOCATION USING A STYLUS PEN

(71) Applicant: Samsung Electronics Co., Ltd., Gyeonggi-do (KR)

(72) Inventor: Vijay Bollineni, Bangalore (IN)

(73) Assignee: Samsung Electronic Co., Ltd (KR)

( * ) Notice: Subject to any disclaimer, the term of this patent is extended or adjusted under 35 U.S.C. 154(b) by 428 days.

(21) Appl. No.: 13/931,159

(22) Filed: Jun. 28, 2013

(65) Prior Publication Data
US 2014/0002397 A1    Jan. 2, 2014

(30) Foreign Application Priority Data

Jun. 29, 2012  (IN) .......................... 2604/CHE/2012
Mar. 19, 2013  (IN) .......................... 2604/CHE/2012

(51) Int. Cl.
G06F 3/0488    (2013.01)
G06F 3/0354    (2013.01)

(52) U.S. Cl.
CPC ........ G06F 3/03545 (2013.01); G06F 3/0488 (2013.01)

(58) Field of Classification Search
CPC ........................... G06F 3/03545; G06F 3/0488
USPC ........ 345/173–174; 178/18.03, 18.06, 19.01, 178/19.03
See application file for complete search history.

(56) References Cited

U.S. PATENT DOCUMENTS

| | | | |
|---|---|---|---|
| 2003/0107607 A1* | 6/2003 | Nguyen ......................... | 345/863 |
| 2008/0012835 A1* | 1/2008 | Rimon et al. ................. | 345/173 |
| 2008/0278455 A1* | 11/2008 | Atkins et al. ................. | 345/173 |
| 2011/0041102 A1* | 2/2011 | Kim ..................... | G06F 3/04883 715/863 |
| 2011/0304577 A1* | 12/2011 | Brown et al. ................. | 345/174 |

* cited by examiner

*Primary Examiner* — Ibrahim Khan
(74) *Attorney, Agent, or Firm* — The Farrell Law Firm, P.C.

(57) ABSTRACT

A method and device for handling an event invocation at a touchscreen are provided. The method includes identifying the event invocation at a touchscreen of the device, determining if the event invocation is performed using a distal end of the stylus pen, retrieving an assigned predefined action with respect to the event invocation using the distal end of the stylus pen, receiving a confirmation that the assigned predefined action is acceptable, and performing the assigned predefined action for the event invocation by the distal end of the stylus pen.

12 Claims, 10 Drawing Sheets

METHOD AND DEVICE FOR HANDLING EVENT INVOCATION USING A STYLUS PEN

PRIORITY

This application claims priority under 35 U.S.C. §119(a) to an Indian Provisional Patent Application filed in the Indian Patent Office on Jun. 29, 2012 and assigned Serial No. 2604/CHE/2012, and Indian Complete Application filed in the Indian Patent Office on Mar. 19, 2013 and assigned Serial No. 2604/CHE/2012, the contents of each of which are incorporated herein by reference.

BACKGROUND

1. Field of the Invention

The present invention generally relates to a method and a device for handling event invocation using a stylus pen, and more particularly, to a method of handling the event invocation of distal end of the stylus pen that is used to operate the device.

2. Description of the Related Art

Conventional smart phones and other devices that have touchscreens can be operated with both a stylus pen and with fingers. Smart phones and similar devices prevalently use capacitance or resistance based event invocation system in the touchscreens to receive instructions from users of the devices.

For example, changes in capacitance due to the touch of fingers or stylus pens are detected by a controller of the device and appropriate instructions are executed by the device. There are a set of steps performed by the device to execute each and every operation in accordance with the touch or invocation at the display portion of the device. It is widely perceived that the user of the device has to navigate through many screens to perform a particular desired function. Further, if the desired function is to be repeatedly performed, the user may experience fatigue. It may even be monotonous when the actions need to be performed with the help of the stylus pen.

Furthermore, there are certain situations where the user of the device may need to perform certain functions in an urgent manner. In such cases, navigation using stylus pens may be considered tedious and inefficient.

SUMMARY

The present invention has been made to address at least the above-mentioned problems and/or disadvantages described above and to provide at least the advantages described below.

According to an aspect of the present invention, a method of handling event invocation in a device using a stylus pen is provided. The method includes identifying the event invocation at a touchscreen of the device, determining if the event invocation is performed using a distal end of the stylus pen, retrieving an assigned predefined action with respect to the event invocation from the distal end of the stylus pen, receiving a confirmation that the action is acceptable, and performing the action for the event invocation by the distal end of the stylus pen.

According to another aspect of the present invention, a device for handling event invocation using a distal end of a stylus pen is provided. The device includes a touchscreen with a touch sensitive surface adapted to be operable with both a front end and a distal end of a stylus pen, a controller capable of executing a set of instructions on receiving event invocation from the distal end of the stylus pen, and a memory connected to the controller and being configured with the set of instructions. The set of instructions includes identifying the event invocation at a touchscreen of the device, determining if the event invocation is performed using a distal end of the stylus pen, retrieving an assigned predefined action with respect to the event invocation from the distal end of the stylus pen, receiving a confirmation that the action is acceptable, and performing the action for the event invocation by the distal end of the stylus pen.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

In the following detailed description of the embodiments of the present invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
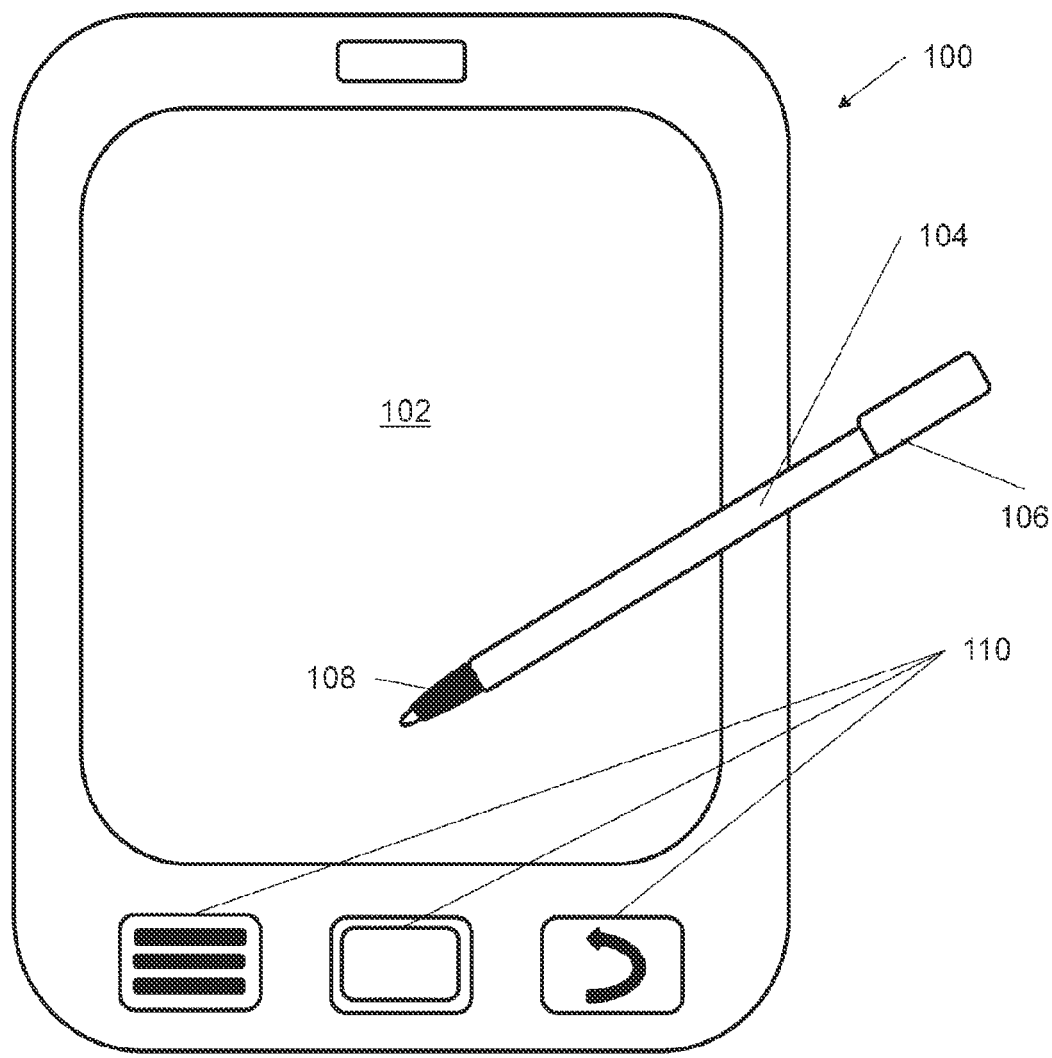
FIG. 1 illustrates a device operable with a stylus pen in accordance with an embodiment of the present invention.

FIG. 1 illustrates a device 100 operable with a stylus pen 104 in accordance with various embodiments of the present invention.

The device 100 can be a computing device such as a smart phone, a tablet, a lap top, a communication and navigation device and the like. A touchscreen 102 is shown, and is capable of detecting gestures by users of the device 100 to enable performing various operations. There are various types of touchscreens that are known to persons skilled in the art, including capacitance based touchscreens. Such touchscreens operate based on variations in capacitances at locations of the touchscreen 102 and trace the locations. In an embodiment of the present invention, the touchscreen 102 is a capacitance based touchscreen. Besides the capacitance based touchscreen, other types of touchscreens can also be used. The touchscreen 102 can be invoked by gestures of fingers of the user or the stylus pen 104.

The stylus pen 104 includes a proximal or front end 108 and a distal or rear end 106. Both the proximal end 108 and the distal end 106 can be used to activate or invoke the touchscreen 102 of the device 100 in accordance with various embodiments of the present invention. In other words, both the proximal end 108 and the distal end 106 of the stylus pen 104 can invoke user actions in the device 100.

There are numerous ways for the device 100 to identify when event invocation is performed at the touchscreen 102 whether the event invocation is done using the proximal end 108 of the stylus pen 104 or the distal end 106 of the stylus pen 104. Some of the techniques include assigning different magnitudes of capacitances for each end of the stylus pen 104, providing varying modulations for capacitance for each of the ends of the stylus pen 104 and so on. There are other techniques that might be known to persons skilled in the art. Herein, the term "input event" can be used instead of "event invocation".

Figure 2:
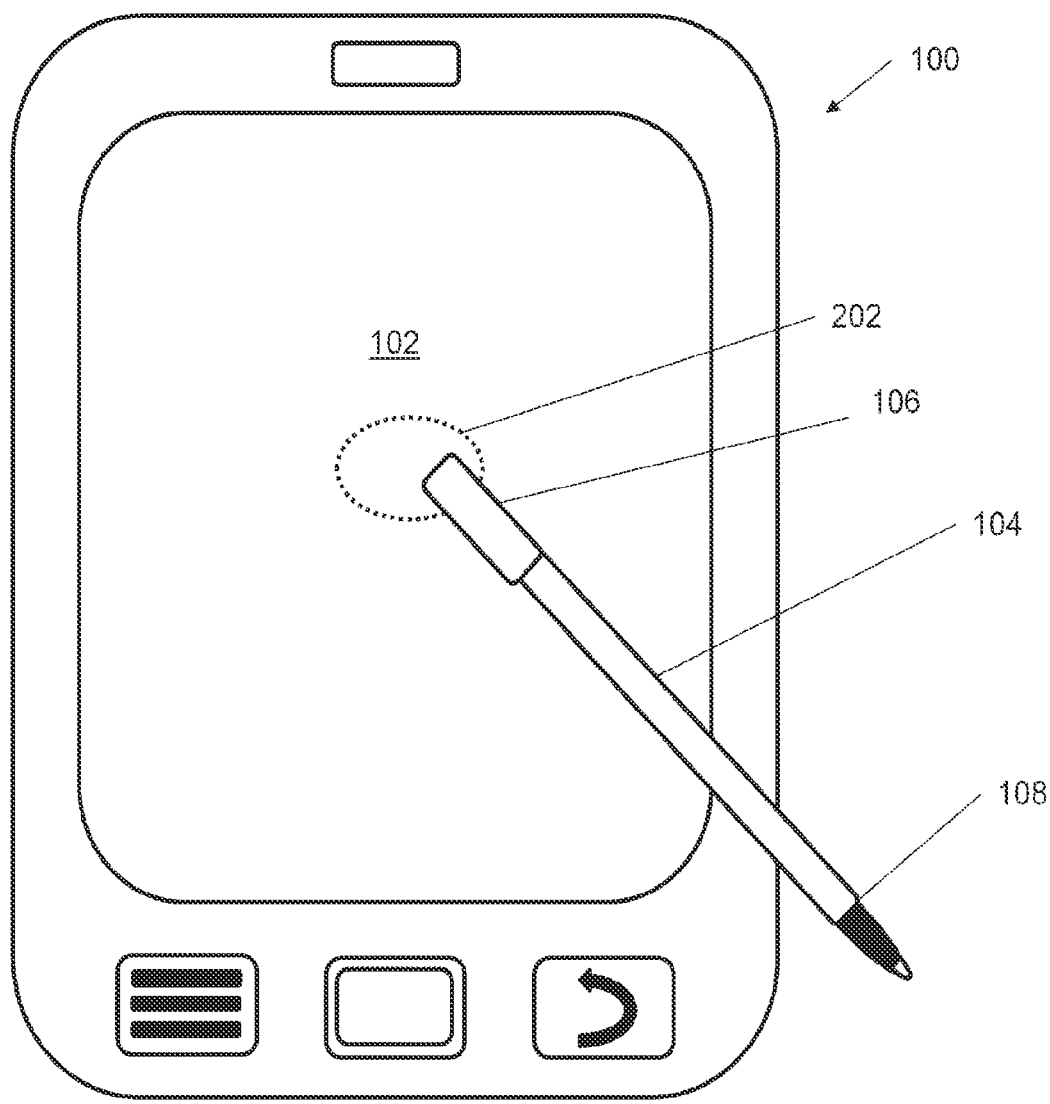
FIG. 2 illustrates an event invocation using a distal end of the stylus pen in accordance with an embodiment of the present invention.

FIG. 2 illustrates event invocation using the distal end 106 of the stylus pen 104 in accordance with an embodiment of the present invention.

In accordance with FIG. 2, a spot 202 of the touchscreen 102 is displayed as a point of invocation by using the distal end 106 of the stylus pen 104. When the user touches the screen 102 with the distal end 106 of the stylus pen 104, the device 100 detects and differentiates the invocation is performed using the distal end 106. The location of the point of invocation at the touchscreen is determined using grid techniques and pixels, dividing the touchscreen 102 into rows and columns, in a technique that is already known in the art.

Figure 3A:
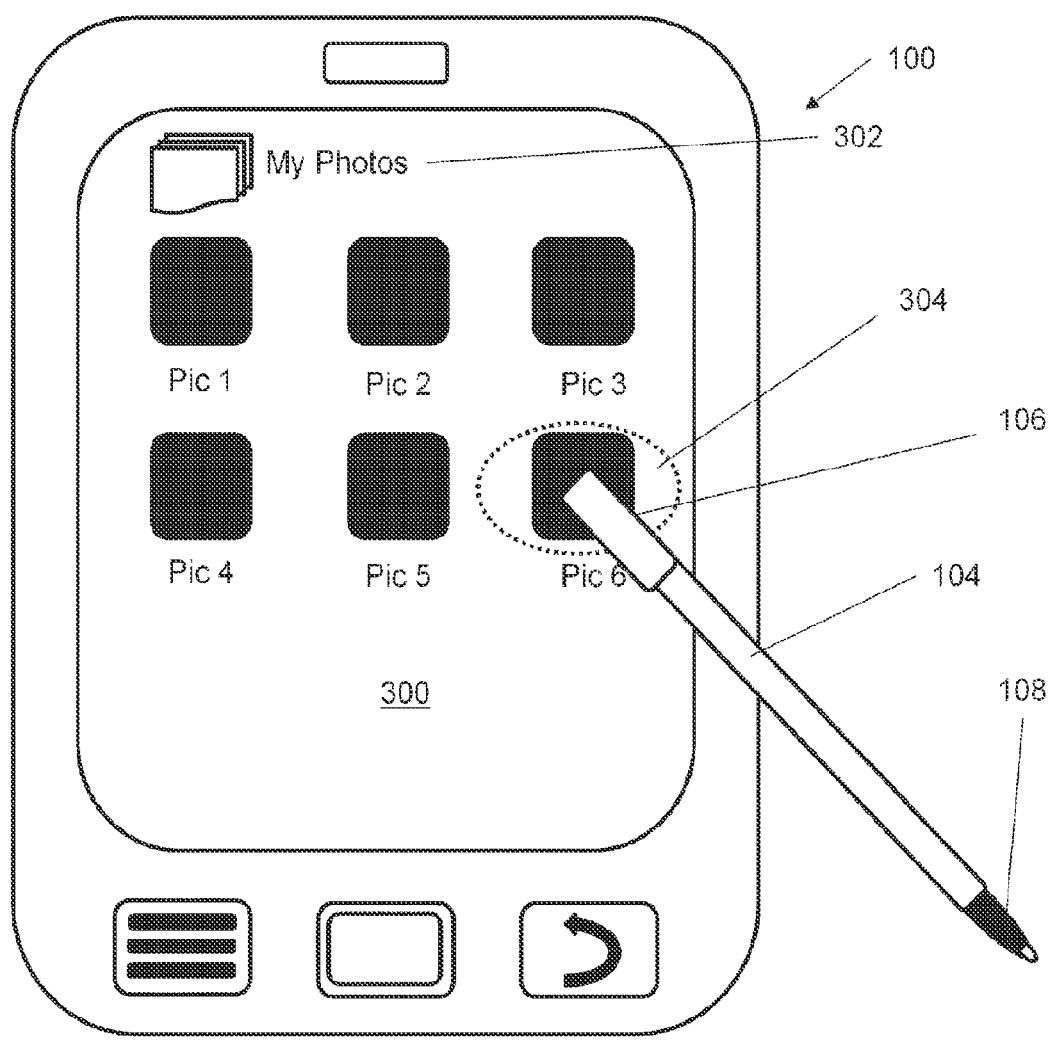
FIG. 3A illustrates an event that can be executed with the distal end of the stylus pen with respect to an e-mailing application in the device in accordance with an embodiment of the present invention.

FIG. 3A illustrates an event that can be executed with the distal end 106 of the stylus pen 104 with respect to an e-mailing application in the device 100 in accordance with an embodiment of the present invention.

In accordance with the present embodiment, the distal end 106 of the stylus pen 104 is used for the event invocation of attaching a picture or an image file as an attachment to the e-mail. In the embodiment, the user of the device 100 has access to a folder 302 identified as "my photos" and an appropriate interface screen 300 is displayed. For example, one or more images may be present in the folder 302 named 'Pic 1', 'Pic 2', 'Pic 3', 'Pic 4', 'Pic 5', and 'Pic 6'.

In the present example, the user of the device 100 selects 'Pic 6' present in the interface screen 302 with the distal end 106 of the stylus pen 104. For instance, spot 304 denotes that an icon at that particular location of the touchscreen 102 is activated.

Figure 3B:
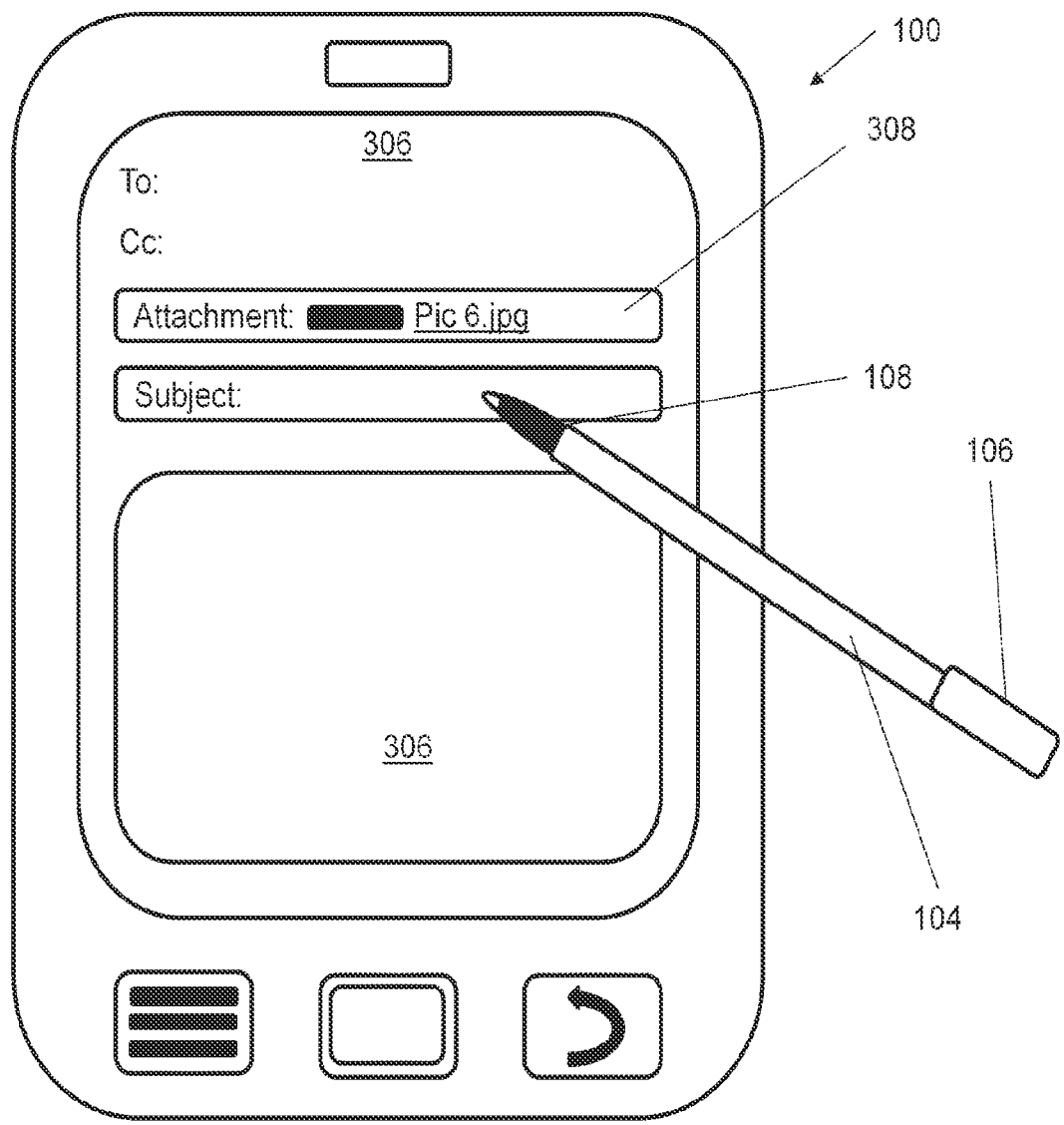
FIG. 3B illustrates a predefined action assigned for invocation using the distal end of the stylus pen with respect to the e-mailing application in accordance with an embodiment of the present invention.

FIG. 3B illustrates a predefined action assigned for invocation using the distal end 106 of the stylus pen 104 with respect to an e-mailing application in accordance with an embodiment of the present invention.

In accordance with the present embodiment, with respect to an application currently running, such as an e-mailing application, the predefined action assigned for event invocation at the image file such as 'Pic 6' results in attaching the image to the e-mail. The predefined action is activated when the distal end 106 of the stylus pen 104 is used for event invocation. An interface screen 306 denotes an attached image file 308 as a consequence of the event invocation. It is noted that the predefined action is confined to the application currently running (e-mailing). In accordance with this embodiment, the user of the device 100 may assign a different action to each of the applications present in the device 100. For selection of any other item in the interface of FIG. 3B the proximal end 108 of the stylus pen 104 shall be used.

Figure 4A:
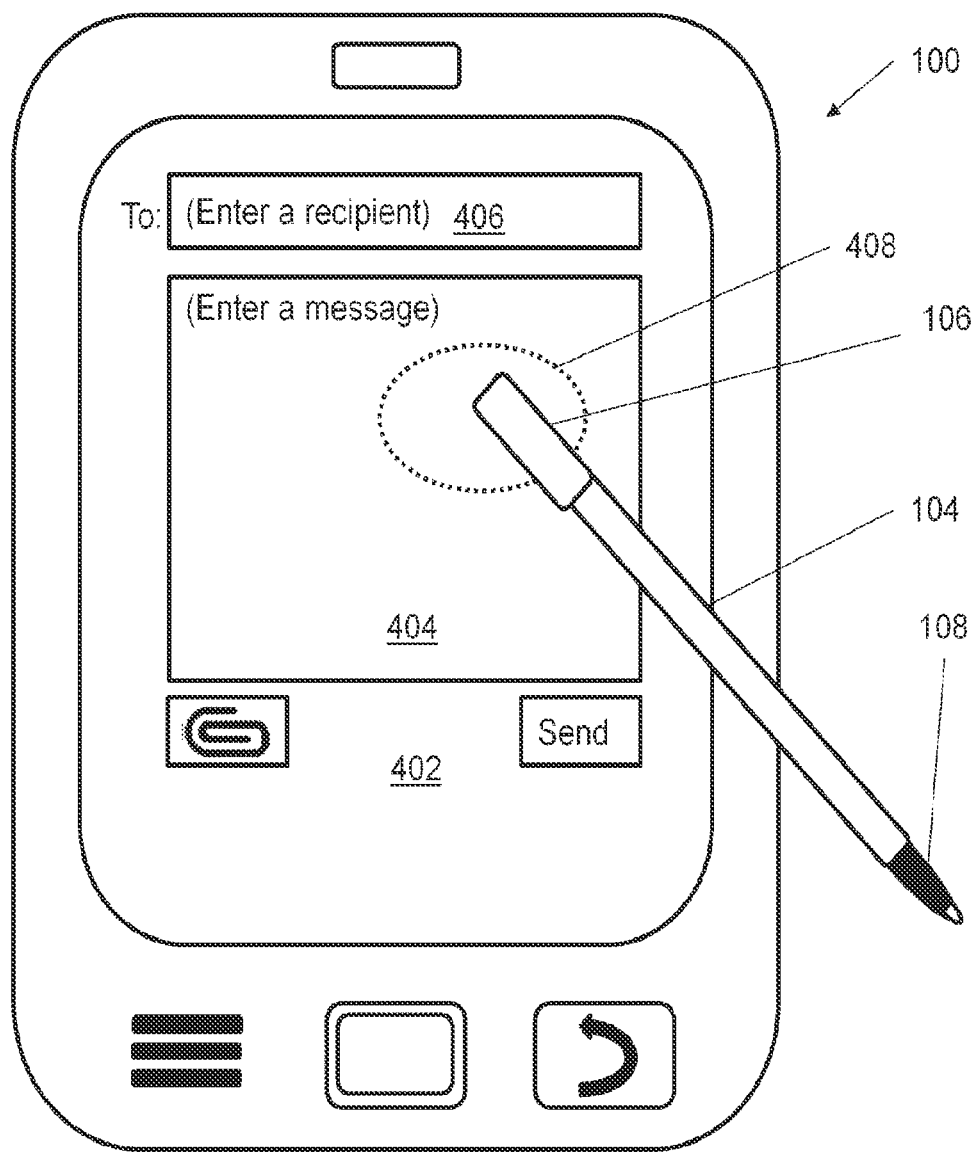
FIG. 4A illustrates an event that can be executed with the distal end of the stylus pen with respect to a text messaging application in the device in accordance with an embodiment of the present invention.

FIG. 4A illustrates an event that can be executed with the distal end 106 of the stylus pen 104 with respect to a text messaging application in the device 100 in accordance with an embodiment of the present invention.

Interface screen 402 of the device 100 shows a text messaging application configured on it. The basic fields of the text messaging application, text box 404, and recipient address box 406 are provided. The distal end 106 of the stylus pen 104 is used at the text box 404. A spot 408 on the interface screen 402 denotes a point of invocation in accordance with the present example using the distal end of the stylus pen 104, which causes the display of the icons.

Figure 4B:
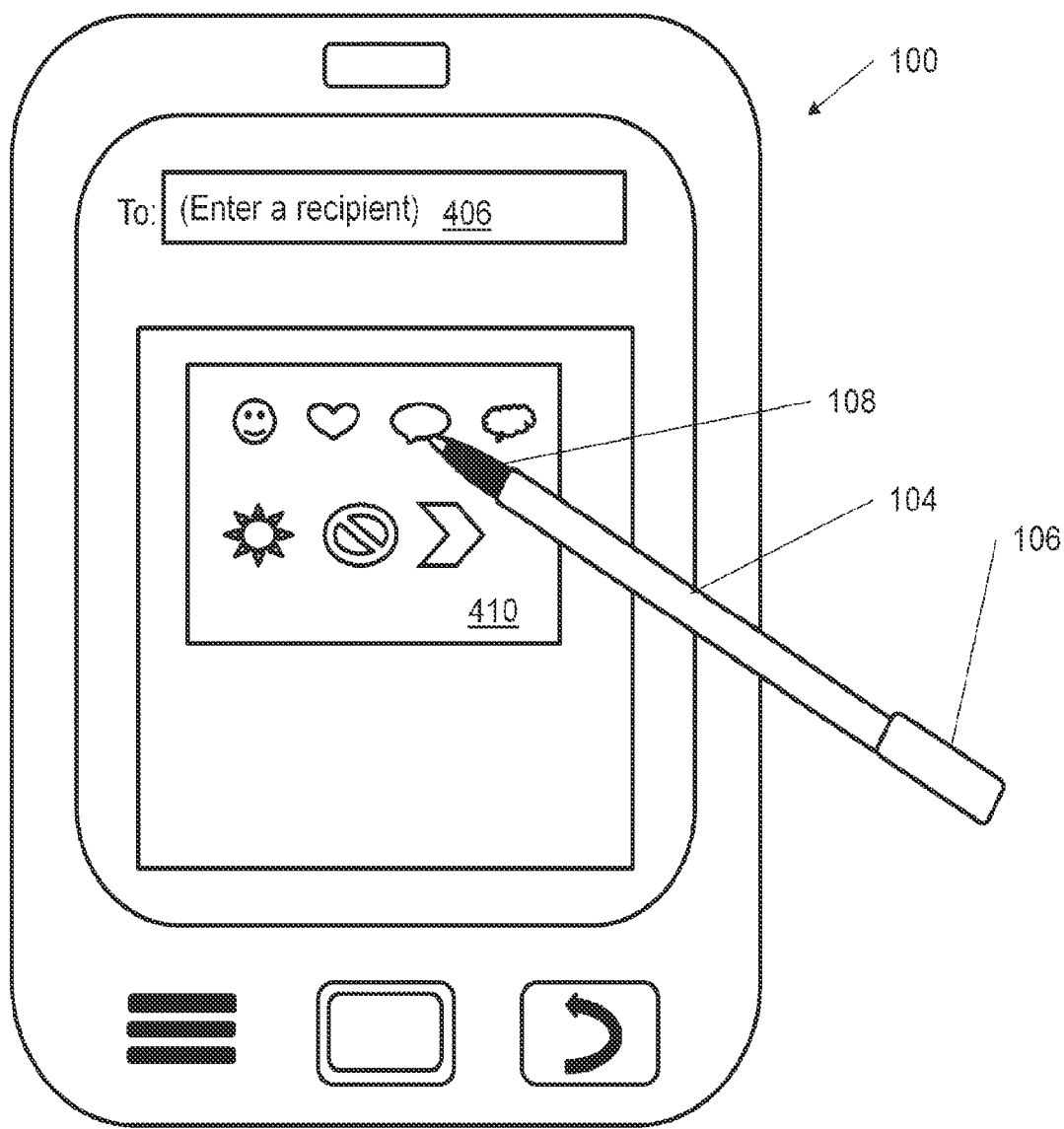
FIG. 4B illustrates a predefined action assigned for invocation using the distal end of the stylus pen with respect to the text messaging application in accordance with an embodiment of the present invention.

FIG. 4B illustrates a predefined action assigned for invocation using the distal end 106 of the stylus pen 104 with respect to the text messaging application in the device 100 in accordance with an embodiment of the present invention.

In the present embodiment, the predefined action for the event invocation at the text box 404 of the text messaging application provides a box 410 of frequently used symbols to the user of the device 100. Some of the frequently used symbols are provided in the box 410 for the user of the device 100 to select. In order to select one of the frequently used symbols, the user may have to use the proximal end 108 of the stylus pen 104 in FIG. 4B.

Figure 5A:
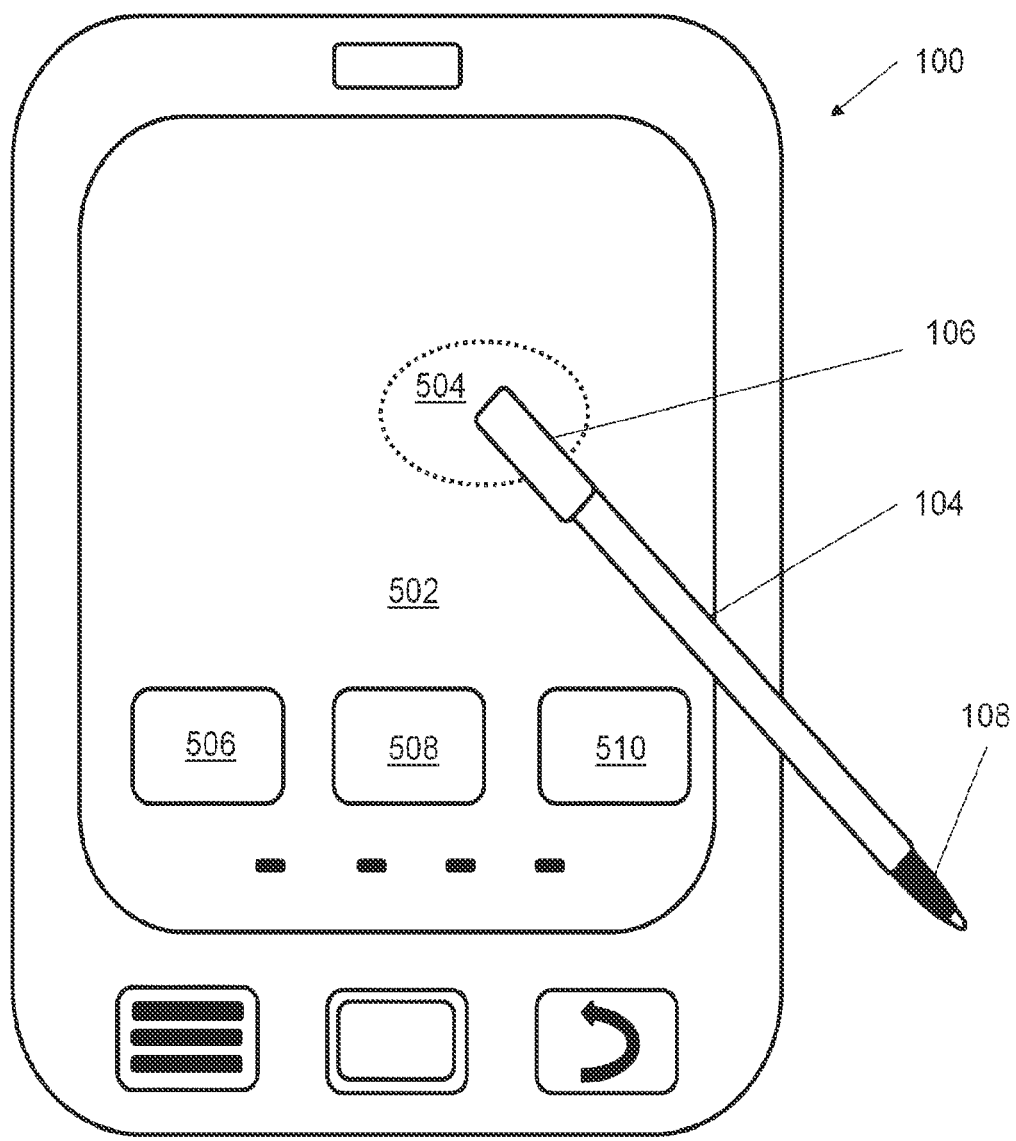
FIG. 5A illustrates an event invocation at an idle screen of the device using the distal end of the stylus pen in accordance with an embodiment of the present invention.

FIG. 5A illustrates an event invocation at an idle screen 502 of the device 100 using the distal end 106 of the stylus pen 104 in accordance with an embodiment of the present invention.

The idle screen 502 is a type of screen which displays one or more icons (506, 508, and 510) at the interface screen of the device 100 for the user to select. A spot 504 denotes the point of invocation at the idle screen 502 of the device 100 using the distal end 106 of the stylus pen 104. In the present example, the changes or predefined actions that are assigned to the event invocation are system level implementations and not specific to any applications running in the device 100.

Figure 5B:
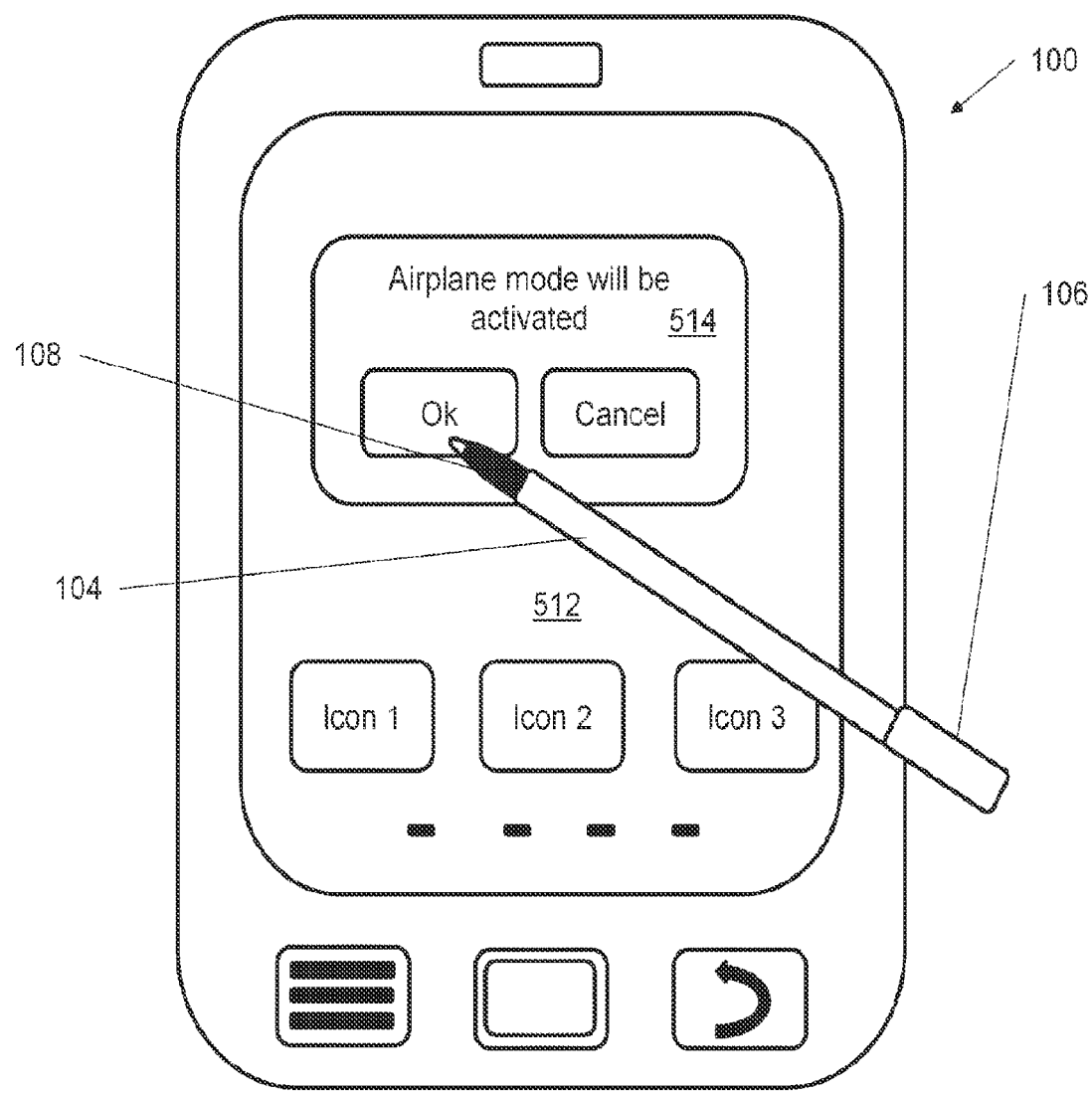
FIG. 5B illustrates a predefined action for event invocation at the idle screen of the device in accordance with an embodiment of the present invention.

FIG. 5B illustrates the predefined action for event invocation at the idle screen 502 of the device 100 in accordance with an embodiment of the present invention.

Due to the event invocation at the idle screen 502 of the device 100, an updated screen 512 is provided to the user of the device 100. A dialogue box 514 is presented to the user of the device 100 to allow the user to decide whether to apply "airplane mode" to the entire system of the device 100. This is a system level implementation due to the event invocation using the distal end 106 of the stylus pen 104. The dialogue box 514 is intended to provide a real option to the user to determine whether to decide if the airplane mode is to be applied or not. If the airplane mode is applied to the device 100, network communications may be terminated. Further, for each of the idle screens the device 100 may have, at least one predefined function is assigned when the event invocation is enabled in the device 100. This type of assigning the predefined function for each of the idle screens can be performed either by the device 100 or by the user.

Figure 6:
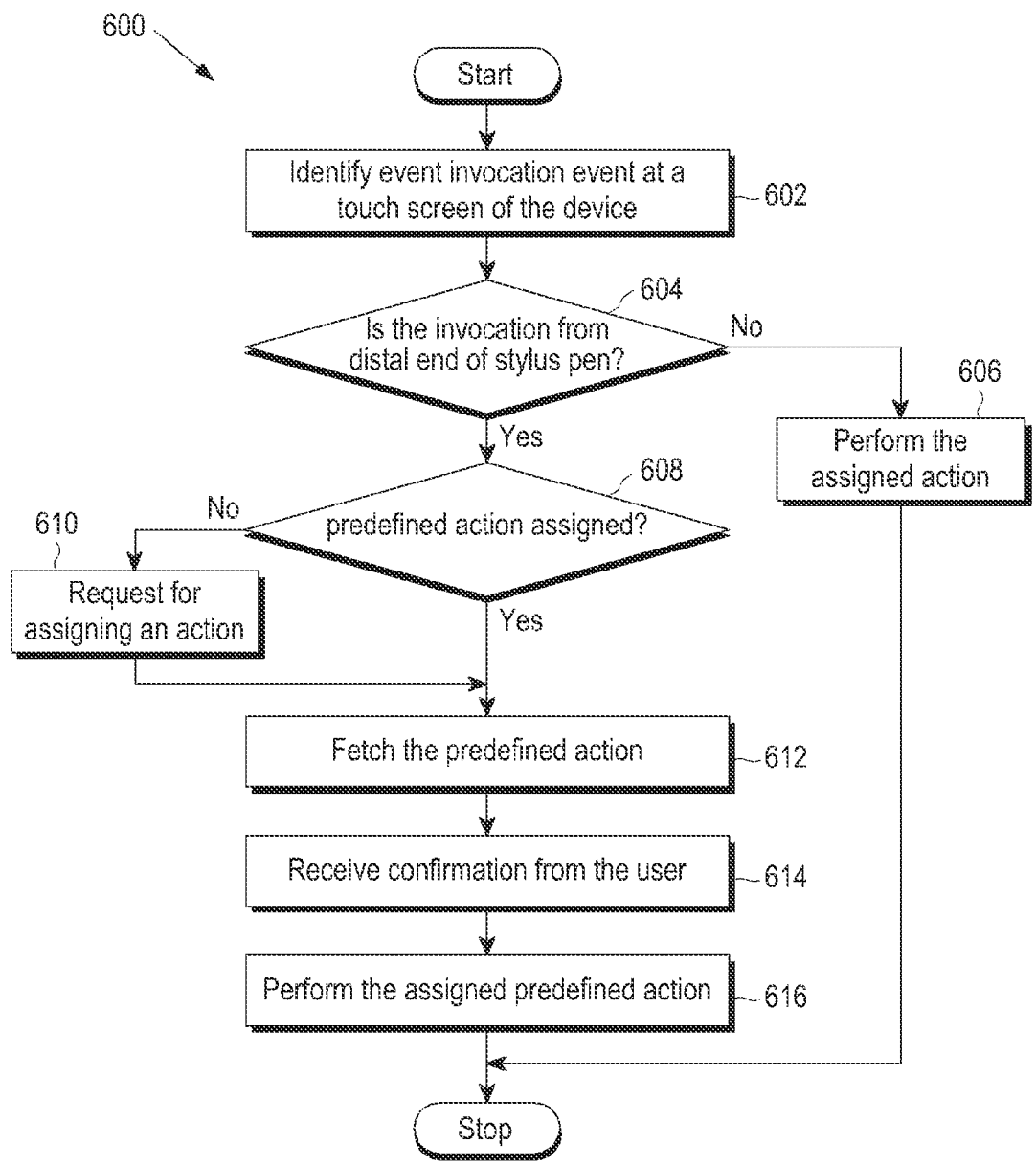
FIG. 6 illustrates a flowchart showing handling event invocation using a stylus pen in a device in accordance with an embodiment of the present invention.

FIG. 6 is a flowchart of a method 600 of handling event invocation using the stylus pen 104 in the device 100 in accordance with an embodiment of the present invention.

In step 602, the device 100 identifies the event invocation at the touchscreen 102 of the device 100. In step 604, the device 100 determines whether the event invocation has occurred due to the usage of the distal end 106 of the stylus pen 104. If not, in step 606, the device 100 performs the predefined action for event invocation of the proximal end 108 of the stylus pen 104.

If yes, in step 608, the device 100 determines whether any predefined action is assigned for the event invocation using the distal end 106 of the stylus pen 104. To determine this, the device 100 analyses a signal created at the touchscreen 102 due to invocation using the distal end 106 of the stylus pen 104, and interprets that the signal created at the touchscreen 102 to be from the distal end 106 of the stylus pen 104. If not, in step 610, the device 100 requests that the user assigns a predefined action. This may be done by providing a request screen to the user to select an action. If the predefined action for the event invocation using the distal end 106 of the stylus pen 104 is already assigned, in step 612, the device 100 retrieves the predefined action by initializing the predefined action in the device 100 with respect to the event invocation using the distal end 106 of the stylus 104. In step 614, optionally, the user may be required to provide an input to accept or reject the predefined action.

In step 616, the predefined action, as assigned, is performed at the device 100. Generally, the predefined action can be assigned by the manufacturer of the device 100, or more preferably, by the User experience (UX) writer, or developer of the application. Further, the user of the device 100 may also assign the predefined action. The predefined action as a result of the event invocation using the distal end 106 of the stylus pen 104 is implementation specific. The implementation includes application level implementation (e.g. FIG. 3A, FIG. 3B, FIG. 4A, and FIG. 4B) or system level implementation (FIG. 5A and FIG. 5B). Hence, the predefined action is one of application specific predefined action and system level predefined action. The system level predefined action affects the existing configuration or settings of the device 100. For example, the system level predefined action may be implemented at 'Operating System' levels of the device 100. However, it is noted that the implementations provided through the description of the drawings are only examples. Any number and type of implementations, as a result of the event invocation using the distal end 106 of the stylus pen 104, is possible in the device 100 and can be realized by persons skilled in the art. Such modifications can be performed without deviating from the scope of the present invention.

Figure 7:
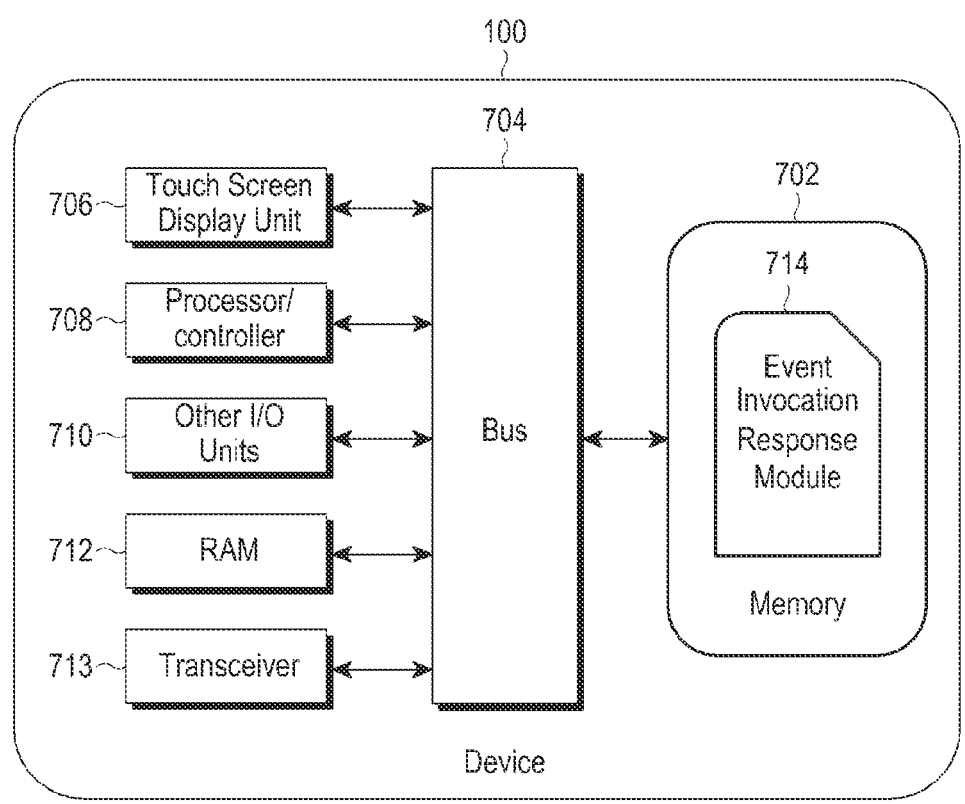
FIG. 7 is a block diagram illustrating the device for handling event invocation using a stylus pen in accordance with an embodiment of the present invention.

FIG. 7 is a block diagram illustrating the device 100 for handling event invocation using the stylus pen 104 in accordance with an embodiment of the present invention.

The device 100 includes a memory 702, a bus 704, a touchscreen display unit 706, a processor 708, other Input/Output (I/O) units 710, Random Access Memory (RAM) 712, and a transceiver 713.

The memory 702 includes an event invocation response module 714 configured to perform all the method steps as illustrated in the method 600 of FIG. 6, and at least one of the steps performed by the device 100 as illustrated in FIGS. 3A to 5B. In an embodiment, the event invocation response module 714 is configured to perform the steps of identifying the event invocation at the touchscreen 102 of the device 100, determining if the event invocation is performed using the distal end 106 of the stylus pen 104, retrieving an assigned predefined action with respect to the event invocation from the distal end 106 of the stylus pen 104, receiving a confirmation that the assigned predefined action is acceptable, and performing the assigned predefined action for the event invocation by the distal end 106 of the stylus pen 104. Further, the memory 702 may be a volatile memory and a non-volatile memory. A variety of computer-readable storage media may be stored in and accessed from the memory elements. The memory elements may include any suitable memory device(s) for storing data and machine-readable instructions, such as read only memory, random access memory, erasable programmable read only memory, electrically erasable programmable read only memory, hard drive, removable media drive for handling memory cards, Memory Sticks™, and the like.

The controller or processor 708 is capable of executing a set of instructions on receiving the event invocation from the distal end 106 of the stylus pen 104. The controller 708, as used herein, refers to any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 708 may also include embedded controllers, such as generic or programmable logic devices or arrays, application specific integrated circuits (ASICs), single-chip computers, smart cards, and the like.

The touchscreen display unit 706 includes a touch sensitive surface adapted to be operable with both the proximal end 108 and the distal end 106 of the stylus pen 104. The display unit 706 is also responsive to multiple gestures with fingers of the user of the device 100. The touchscreen display unit 706 may use one of resistance based, surface acoustic wave based, capacitance based, infrared based, optical imaging based, dispersive signal based, and acoustic pulse recognition based technology. Further the display unit 706 may include multiple layers of different materials to implement the touch sensitive surface in the device 100.

The other components of the device 100 such as the bus 704, the RAM 712, the transceiver 713 and the I/O units 710 such as interfaces, sound output ports, speakers, and the like, are known to persons skilled in the art. Hence, further description is omitted.

The present invention has been described with reference to certain embodiments. Furthermore, the various devices, modules, selectors, estimators, and the like described herein may be enabled and operated using hardware circuitry, for example, complementary metal oxide semiconductor (CMOS) based logic circuitry, firmware, software and/or any combination of hardware, firmware, and/or software embodied in a machine readable medium. For example, the various electrical structures and methods may be embodied using transistors, logic gates, and electrical circuits, such as ASICs.

While the present invention has been particularly illustrated and described with reference to certain embodiments thereof, various modifications or changes can be made without departing from the scope of the present invention. Therefore, the scope of the present invention is not limited to the described embodiments, should be defined by the scope of the following claims and any equivalents thereof.

What is claimed is:

1. A method of handling event invocation in a device using a stylus pen having a front end and a distal end configured to perform a touch input on a touch screen, the method comprising:
   identifying an event invocation using the distal end of the stylus pen at a touchscreen of the device;
   determining a currently running application if the event invocation using the distal end of the stylus pen is performed;
      determining whether a predefined action corresponding to the currently running application is assigned for the event invocation for the currently running application;
      in response to determining that the predefined action is not assigned, displaying a request screen for assigning the predefined action for the event invocation;
      in response to determining that the predefined action is assigned, retrieving the predefined action for the event invocation; and
   performing the predefined action.

2. The method of claim 1, wherein identifying the event invocation using the distal end of the stylus pen comprises:
   analyzing a signal created at the touchscreen due to an invocation using the distal end of the stylus pen; and
   interpreting that the signal created at the touchscreen is from the distal end of the stylus pen.

3. The method of claim 1, wherein retrieving the predefined action comprises:
   initializing the predefined action in the device with respect to the event invocation using the distal end of the stylus pen.

4. The method of claim 3, further comprising:
   when the event invocation using the distal end of the stylus pen is performed at an idle screen of the device, retrieving the predefined action for the event invocation using the distal end of the stylus pen for the idle screen,
   wherein the predefined action comprises a system level predefined action.

5. The method of claim 4, wherein the system level predefined action is executed to perform an action that affects an existing configuration of the device.

6. The method of claim 1, wherein the predefined action is an application level predefined action, and the application level predefined action is executed to perform an action with respect to the currently running application.

7. A device comprising:
   a touch screen with a touch sensitive surface adapted to be operable with both a front end and a distal end of a stylus pen configured to perform a touch input on a touch screen;
   a controller configured to execute a set of instructions on receiving an event invocation from the distal end of the stylus pen; and
   a memory connected to the controller, the memory configured with the set of instructions, the set of instructions comprising:
      identifying the event invocation using the distal end of the stylus pen at the touchscreen of the device;
      determining a currently running application if the event invocation using the distal end of the stylus pen is performed;
      determining whether a predefined action corresponding to the currently running application is assigned for the event invocation for the currently running application;
         in response to determining that the predefined action is not assigned, displaying a request screen for assigning the predefined action for the event invocation; and
         in response to determining that the predefined action is assigned, retrieving the predefined action for the event invocation; and
      performing the predefined action.

8. The device of claim 7, wherein identifying the event invocation using the distal end of the stylus pen comprises:
   analyzing a signal created at the touchscreen due to an invocation using the distal end of the stylus pen; and
   interpreting that the signal created at the touchscreen is from the distal end of the stylus pen.

9. The device of claim 7, wherein retrieving the predefined action comprises:
   receiving user inputs in assigning the predefined action to be performed on experiencing the event invocation; and
   initializing the predefined action in the device with respect to the event invocation using the distal end of the stylus pen.

10. The device of claim 9, wherein the set of instructions further comprises:
    when the event invocation using the distal end of the stylus pen is performed at an idle screen of the device, retrieving the predefined action for the event invocation using the distal end of the stylus pen for the idle screen,
    wherein the predefined action comprises a system level predefined action.

11. The device of claim 10, wherein the system level predefined action is executed to perform an action that affects an existing configuration of the device.

12. The device of claim 7, wherein the predefined action is an application level predefined action, and the application level predefined action is executed to perform an action with respect to the currently running application.

* * * * *